Patented Mar. 8, 1932

1,848,329

UNITED STATES PATENT OFFICE

CARLETON ELLIS, OF MONTCLAIR, NEW JERSEY, ASSIGNOR, BY MESNE ASSIGNMENTS, TO REZYL CORPORATION, OF NEW YORK, N. Y., A CORPORATION OF DELAWARE

NONCURLING FLOOR COVERING

No Drawing.    Application filed November 22, 1927.    Serial No. 235,115.

This invention relates to floor coverings and relates in particular to floor coverings having as an under layer or supporting web ordinary asphalt-saturated felt base and as a tread coating a layer containing cellulose acetate and filling material.

This application is a continuation in part of my copending applications Serial Nos. 148,112; 152,308; 152,309; 152,520 and 150,387. In those companion applications there is disclosed and claimed the floor covering employing the cellulose esters broadly and also specific compositions containing nitrocellulose. While such subject-matter is also disclosed in the instant case, the instant application is limited to the cellulose acetate composition.

The cellulose acetate which I prefer to employ is one of the acetone-soluble types and is preferably of medium viscosity. Likewise, I may use mixed esters such as the mixed formate-acetate, nitrate-acetate, and the like.

A procedure illustrative of the present invention is made by dissolving 80 parts by weight of cellulose acetate (about 15 second viscosity material) in 75 parts of triacetin, 30 parts acetone and 25 parts of alkali-condensed acetone. 2 to 4 parts of ceresin wax are dissolved in 30 parts ethylene dichloride and this solution mixed with the solution of cellulose acetate. 72 parts of ground cork, 32 parts lithopone and 30 parts of whiting are mixed and added to the foregoing solution. The composition then is masticated until smoothly plastic. It is then sheeted onto asphalt-saturated felt base by means of sheeting rolls.

The sheeted material is dried at 70–75° C. for a short space of time, the volatile solvents being recovered if desired.

The floor covering obtained in this way remains flat when placed on the floor and does not have a tendency to curl at the corners or sides. This is important in a floor covering composition. The surface is sufficiently hard and the flexibility and strength is good.

The foregoing procedure is simply illustrative and may be varied considerably, for example, by altering the nature and proportion of the fillers, by variations in the solvents and diluents, and in the character of the cellulose acetate employed, as well as its proportion. The wax may be omitted in some cases, or may be varied in proportion according to the solvents employed.

Preferably I employ mixed solvents which are readily volatile at temperatures somewhat above room temperature, or which will depart from the coating at slightly elevated temperatures, thus enabling rapid drying.

As set forth in the applications noted above I may incorporate various synthetic resins, and the like, especially synthetic resins compatible with cellulose acetate. The effect of adding the resin is fully set forth in said copending applications and reference is made thereto in supplement to the present application.

In Serial No. 142,532, page 26, I have referred to the employment of acetone-soluble cellulose acetate in conjunction with benzoic phthalic glyceride resin or benzoic resins. Also, I have set forth the possibility of using mixtures of nitrocellulose and acetyl cellulose. Other resins which may be employed are the maleic succinic glycerides, also the resins and balsams obtained from these acids with glycols, diethylene glycol, and the like. Other resins are toluyl benzoic succinic glyceride, benzoyl benzoic glycerine, and the like. The proportion of synthetic resin to cellulose acetate may vary, but for floor covering purposes I do not require ordinarily more than an amount of resin equal to that of the acetate.

A resin made by heating to 290° C. the following mixture, namely; benzoyl benzoic acid 20 parts by weight, succinic acid 20 parts; glycerol 11 parts, possessed an acid number of 30.2 and was freely soluble in solvents for cellulose acetate. A binding composition was made from this resin and cellulose acetate dissolved in a solvent mixture composed of 30 vols, of ethyl oxy butyrate, 10 vols. of acetone and 60 vols. of ethylene dichloride.

A resin was made from benzoyl benzoic acid 226 parts, glycerol 62 parts, by heating to 290° C. The acid number was 20.4. This likewise was capable of being employed with cellulose acetate.

Still another product was made from 11 parts succinic acid and 6 parts glycerol heated to 240° C. This was a transparent water-white balsam and can be admixed with cellulose acetate in several proportions.

What I claim is:—

1. A floor covering comprising a base carrying a sheeted tread of cellulose acetate composition.

2. A floor covering comprising a base carrying a sheeted tread of cellulose acetate composition containing a polybasic acid-polyhydric alcohol type condensation product.

3. A floor covering comprising a base carrying a sheeted tread of cellulose acetate composition containing ground cork.

4. A floor covering comprising a base carrying a sheeted tread of cellulose acetate composition containing cork and a polybasic acid-polhydric alcohol resin.

5. A floor covering comprising a base carrying a sheeted tread of cellulose acetate composition including a plasticizer.

6. A floor covering comprising a base carrying a sheeted tread of cellulose acetate composition containing a polybasic acid-polyhydric alcohol type resin and a plasticizer.

7. A floor covering comprising a base carrying a sheeted tread of cellulose acetate composition containing wax.

8. A floor covering comprising a base carrying a sheeted tread of cellulose acetate composition containing a polybasic acid-polyhydric alcohol type resin and wax.

9. A floor covering comprising a base carrying a sheeted tread containing cellulose acetate, plasticizer, wax, cork, and pigment.

10. The method of preparing floor coverings which comprises preparing a cellulose acetate composition adapted to serve as a sheeted tread, and sheeting said composition upon a base.

CARLETON ELLIS.